US007142932B2

(12) United States Patent
Spira et al.

(10) Patent No.: US 7,142,932 B2
(45) Date of Patent: *Nov. 28, 2006

(54) HAND-HELD REMOTE CONTROL SYSTEM

(75) Inventors: Joel S. Spira, Coopersburg, PA (US); Ethan C. Biery, Allentown, PA (US); Andrew Offenbacher, Quakertown, PA (US); Matthew Skvoretz, Emmaus, PA (US)

(73) Assignee: Lutron Electronics Co., Ltd., Coopersburg, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/741,278

(22) Filed: Dec. 19, 2003

(65) Prior Publication Data

US 2005/0137720 A1 Jun. 23, 2005

(51) Int. Cl.
*G05B 11/00* (2006.01)
*G05B 19/18* (2006.01)
*G05B 15/00* (2006.01)

(52) U.S. Cl. ............................ 700/83; 700/17; 700/65

(58) Field of Classification Search ............ 700/19–20, 700/17, 65, 83

See application file for complete search history.

(56) References Cited

U.S. PATENT DOCUMENTS 3,697,821 A 10/1972 Johnson
5,962,992 A 10/1999 Huang et al.
6,100,659 A 8/2000 Will et al.
6,300,727 B1 10/2001 Bryde et al.
6,369,524 B1 * 4/2002 Sid ............................ 315/292
2002/0060530 A1 * 5/2002 Sembhi et al. .............. 315/291
2002/0084910 A1 * 7/2002 Owens et al. .......... 340/825.24
2002/0158591 A1 * 10/2002 Ribarich et al. ............ 315/291
2003/0015302 A1 * 1/2003 Pessina et al. .............. 160/331
2003/0107888 A1 * 6/2003 Devlin et al. ............... 362/233
2003/0151909 A1 * 8/2003 Sid ............................. 362/85

FOREIGN PATENT DOCUMENTS

EP 0 503 699 A1 2/1992
WO WO 00/40057 7/2000

OTHER PUBLICATIONS

Search Report issued by PCT on Jun. 22, 2005 in connection with corresponding application No. PCT/US2004/043261.
Written Opinion of the International Searching Authority for above-identified PCT Search Report.

* cited by examiner

*Primary Examiner*—Anthony Knight
*Assistant Examiner*—Ronald D Hartman, Jr.
(74) *Attorney, Agent, or Firm*—Ostrolenk, Faber, Gerb & Soffen, LLP

(57) ABSTRACT

An infrared hand-held remote control for handling a single or plural devices such as lights, shades, drapes and the like contains ergonomically selected and placed control buttons that are self-describing and easy to use. It allows explicit, easy-to-use control of different functions by providing for each function to be controlled vertically disposed discrete buttons that provide "all or nothing" control of some physical feature and similar, vertically disposed and horizontally aligned "adjust" buttons that allow for fine and continuous control of the physical quantities between the extremes or limits of the discrete button functions. Successive groups of buttons provide for the control of different appliances or devices, where each group of buttons is identified by easy to comprehend icon or alphabetic representations. A preset button is also provided for setting and recalling an operational preset value for the device(s) from memory.

33 Claims, 17 Drawing Sheets

HAND-HELD REMOTE CONTROL SYSTEM

CROSS REFERENCE TO RELATED APPLICATION

This application incorporates by reference U.S. application Ser. No. 10/142,146 filed May 7, 2001 and entitled "Infrared Hand-Held Remote Control".

BACKGROUND OF THE INVENTION

The present invention generally relates to remote controls for appliances such as lights, shades, etc., and, more particularly, relates to ergonomically improved remote controls that are operable with one or several or a variety of appliances.

Remote controls for appliances are ubiquitous. Many existing remote controls incorporate and provide a large array of buttons, functions and features which present a daunting challenge to a new user, all the more so in this age where we are constantly exposed to a very large variety of new electronic devices and need to master and learn them all. Remote controls, such as those referred to in U.S. application Ser. No. 10/142,146, may be provided for home and office based appliances such as lights, window shades and the like, in a particularly ergonomic manner. That is, such remote controls enable the mastering of functionality without having to resort to complex and lengthy manuals or instruction books or the investment of precious time to visually study the remote control.

The basic construction of remote controls, including remote controls that operate in the infrared electromagnetic spectrum are known in the art. For example, U.S. Pat. No. 5,987,205 entitled "Infrared Energy Transmissive Member and Radiation Receiver" which has issued to the assignee of the present invention describes preferred embodiments of circuits and other features of a remote control. The content of the aforementioned U.S. Pat. No. 5,987,205 are incorporated by reference herein. An appliance that can be controlled with the infrared hand-held remote control of the present invention is described in the present assignee's U.S. Pat. No. 5,467,266 and U.S. Pat. No. 5,671,387, and the contents of these two patents are incorporated by reference herein as well.

SUMMARY OF THE INVENTION

It is an object of the present invention to improve an ergonomic hand held remote control, such as the remote control referred to in U.S. application Ser. No. 10/142,146. Specifically, it is an object of the present invention to provide an ergonomic hand held remote control with a preset (i.e., favorite) functionality for at least one device to be controlled. In this manner, an operator of the remote control may store a desired or favorite device setting in a memory, and then recall the preset setting from the memory at a subsequent time. For example, if the remote control is operable to control the illumination setting of a light, the remote control would allow the operator to store a desired illumination setting in memory, and then recall the stored illumination setting at a subsequent time when desired.

To recall the preset setting from memory, the operator may, for example, press a special key, such as a preset key. Thus, for example, if the operator wished to recall the preset setting for illumination of the lights, he/she may press the "preset" button to recall the setting.

To store a new preset setting for the device to be controlled, the operator may press and hold the "preset" button for a time exceeding a predetermined threshold time, such as two seconds. In this manner, the current setting for the device may be stored as the preset (i.e., favorite) setting. Thus, for example, to store the current illumination setting of the lights as the preset setting, the operator would press and hold the "preset" button for a time exceeding, for example, two seconds.

The present invention is embodied in one exemplary embodiment, in which a control system is provided to set a variable physical property of a structure to an operational setting between a maximum setting and a minimum setting. The system includes a control device having first, second, third, fourth buttons and at least one preset button; and a receiving arrangement communicatively coupled to the control device and to the structure. The receiving arrangement includes a memory to store at least one preset setting of the variable physical property, and each of the buttons of the control device is operable to cause a transmission of a respectively assigned signal from the control device to the receiving arrangement when pressed. The receiving arrangement is operable to set the operational setting of the variable physical property to the maximum setting when the control device transmits the signal assigned to the first button, set the operational setting of the variable physical property to the minimum setting when the control device transmits the signal assigned to the second button, increase the operational setting of the variable physical property toward the maximum setting when the control device transmits the signal assigned to the third button, decrease the operational setting of the variable physical property toward the minimum setting when the control device transmits the signal assigned to the fourth button, to set the operational setting of the variable physical property to the preset setting stored in the memory if the preset button is depressed for a time less than a predetermined threshold time, and to store the operational setting of the variable physical property in the memory if the preset button is depressed for a time exceeding the predetermined threshold time.

The control device may be a portable hand-held unit with an infrared coupling system to couple the control device to the control input and the control elements are preferably arrayed over the surface of the portable hand-held unit for manual operation by a user. The underlying electronics can be configured so that only a single one of said first, second, third and fourth control elements are individually operable at any time to initiate the setting of said variable property. The control elements can be depressable switch elements. At least one second structure can be provided separate from the first-mentioned structure. It has a respective single variable second property and fifth, sixth, seventh and eighth control elements that are identical to said first, second, third and fourth control elements, respectively, for controlling said variable property of said second structure in a process identical to the control of said first-mentioned variable structure. The first structure can be a lamp and the variable property, its luminous output. The second structure can be a motor-operated window covering or shade or the like, and its variable property may be its amount of openness.

Preferably, the first and third control elements are laterally adjacent one another and the second and fourth control elements are laterally adjacent to one another. The first control element is disposed vertically above the second control element, whereby the operation of said control elements is easily discernable to a user from the placements of said control elements.

Preferably, the remote control device can operate a single structure or appliance, or several different such structures or appliances. The control device can also be configured with preset buttons that enable the control device to set the physical property to a location or value between the maximum setting and the minimum setting.

Other features and advantages of the present invention will become apparent from the following description of the invention which refers to the accompanying drawings.

DETAILED DESCRIPTION OF PREFERRED EMBODIMENTS

Figure 1:
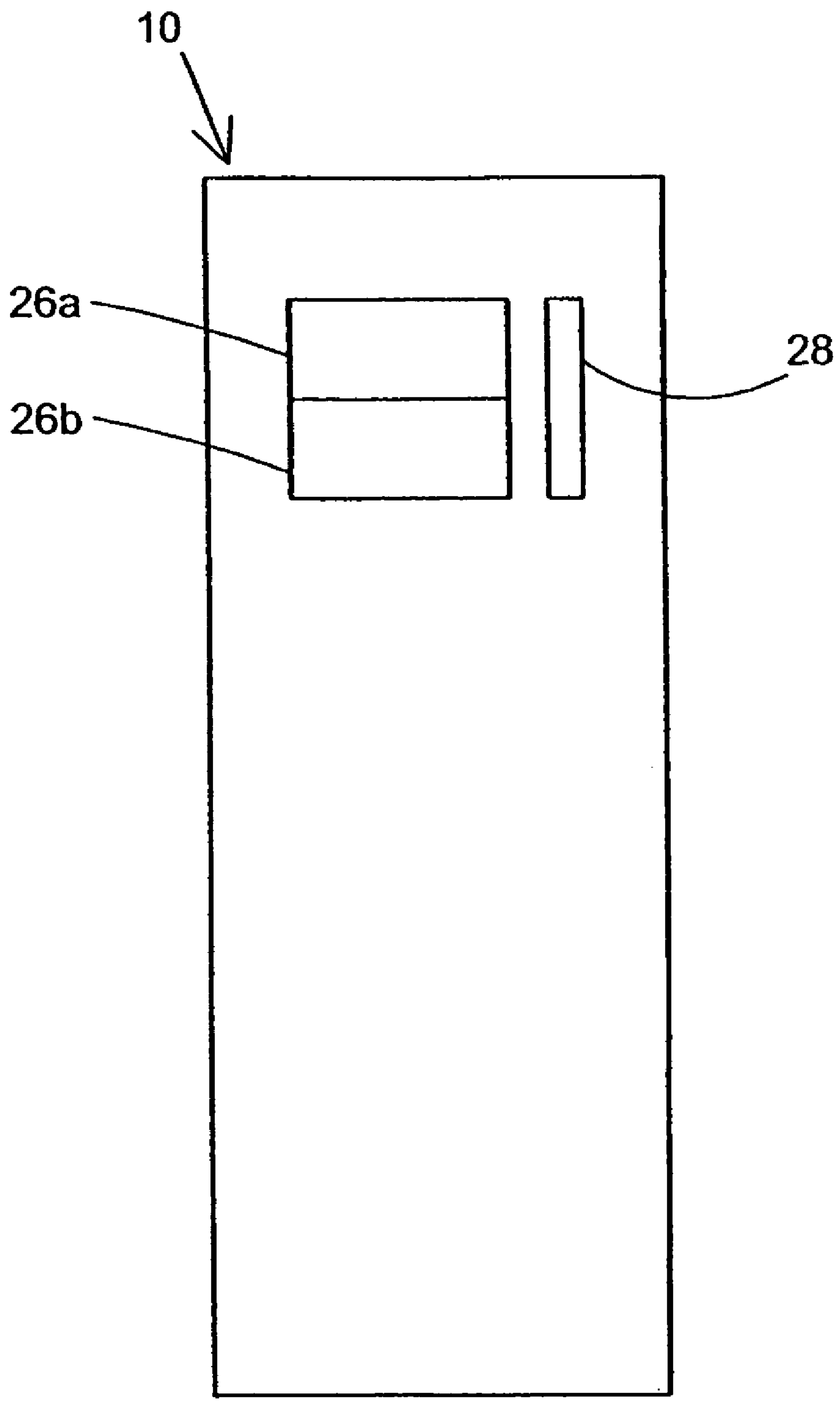
FIG. 1 (PRIOR ART)
FIG. 1 shows a prior art infrared hand-held remote control.

Referring to the drawings, FIG. 1 illustrates a prior art infrared hand-held remote control 10 which is manufactured and sold by the assignee of the present invention. It features two large buttons 26*a* and 26*b* disposed in vertical arrangement on the left side of the control. These buttons 26*a* and 26*b* comprise on and off controls for a light or open and close commands for a shade. Immediately to the right of these buttons, is a slim vertically disposed rocker button 28. This button may be "rocked" forward and back to cause the light to brighten or dim or the shades to open or close in a continuous fashion between the two extremes that are controlled by the on and off (or the open and close buttons) buttons 26*a* and 26*b*.

Figure 2C:
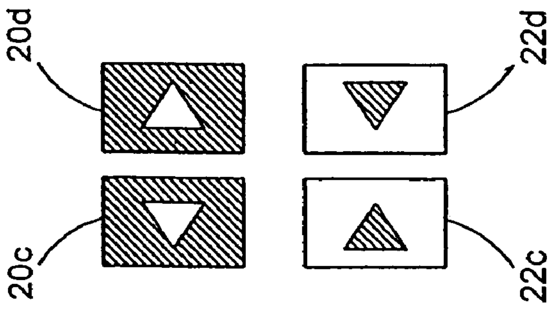
FIGS. 2A, 2B and 2C show different button appearances for the "adjust" buttons of the device of FIG. 2 and various decals or legend choices therefor.
Figure 2B:
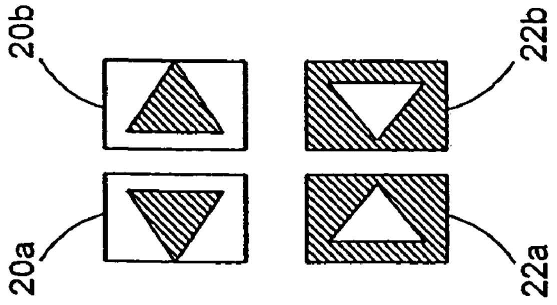
Figure 2A:
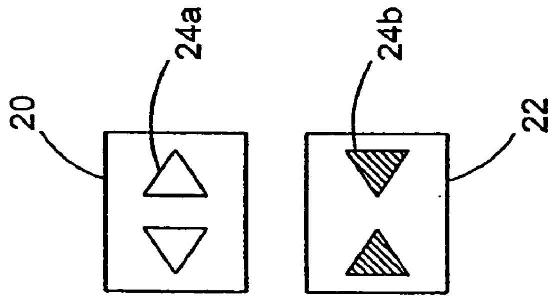
Figure 2:
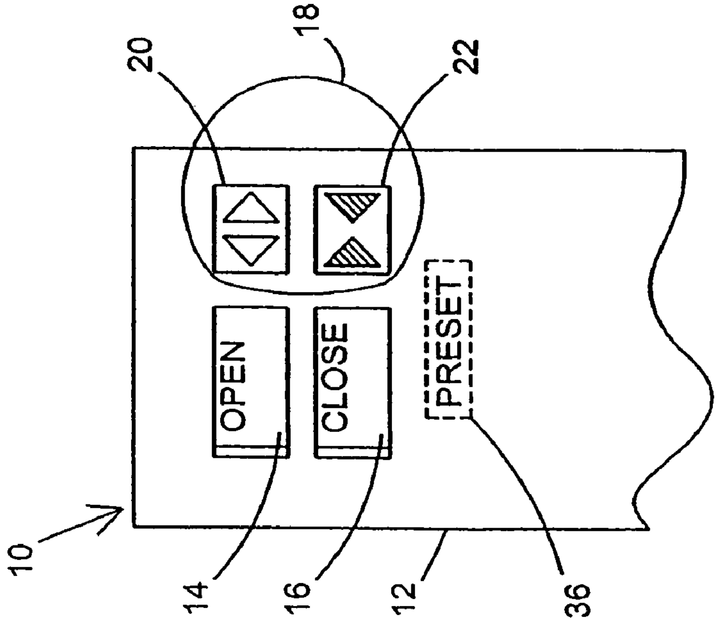
FIG. 2 shows a first embodiment of hand-held remote control in accordance with the present invention.

Referring to FIG. 2 there is seen an ergonomic set of button controls for an otherwise conventional infrared hand-held remote control such as the control 10 of FIG. 1. In FIG. 2, a distinct "open" button 14 and a corresponding "close" button 16 are vertically aligned and these discrete buttons, which provide "full limit" control of some variable physical feature, are accompanied by a pair of horizontally adjacent and vertically aligned "adjust" buttons 20 and 22. Also provided is a preset button 36 for selecting one or more preset values, as more fully described below.

In operation, open and close buttons 14, 16 operate to set a controllable device to "full limit" maximum and minimum settings, respectively. For example, if open and close buttons 14, 16 control drapes, open button 14 would operate to fully open the drapes, whereas close button 16 would operate to fully close the drapes.

Figure 3:
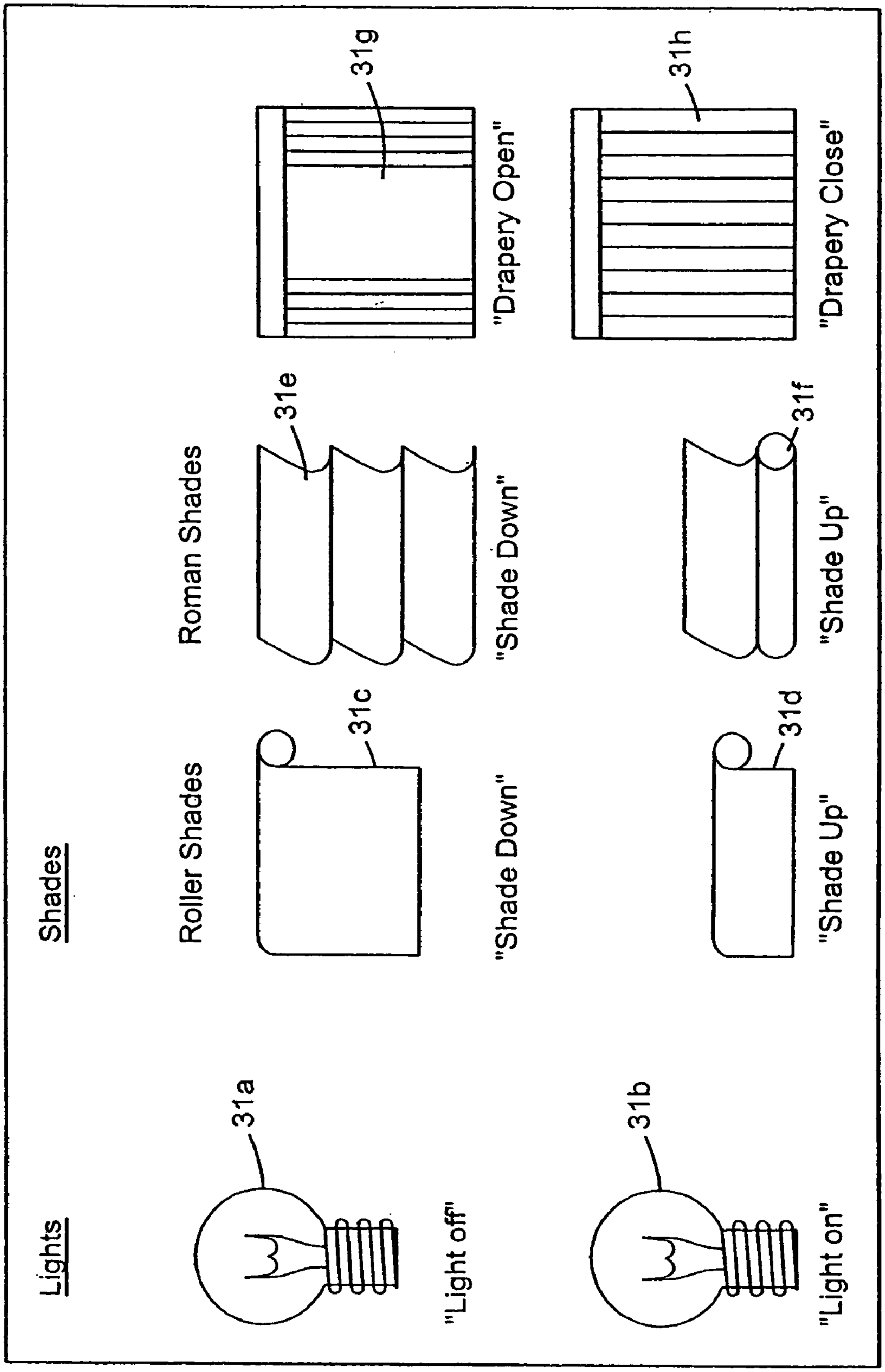
FIG. 3 shows further button shapes and/or decals for the remote control.
Figure 3A:
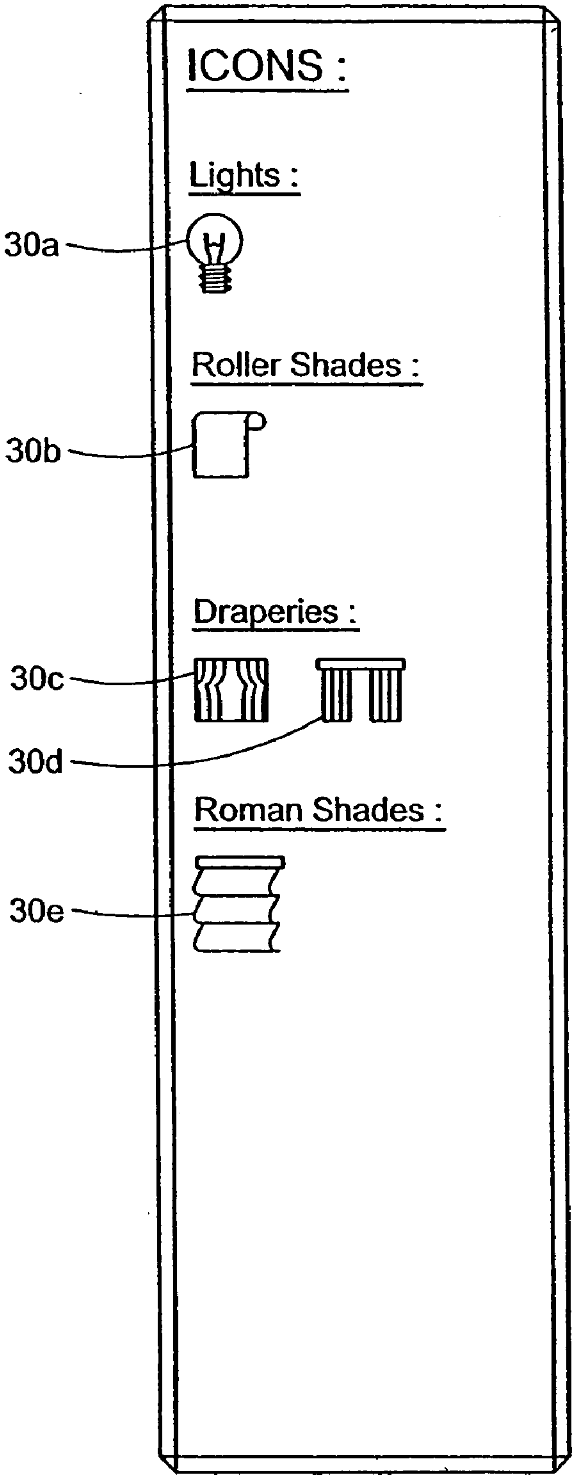
FIG. 3A shows pictorial decals useable with the hand-held device of FIG. 2.

FIG. 3A shows a variety of useable icons such as 30*a* for lights, 30*b* for roller shades, 30*c* and 30*d* for draperies and 30*e* for roman shades. These icons can be incorporated into the remote control 10 shown in FIG. 3B which is provided to control three appliances including drapes, roller shades, and lights. Thus, the icons 30*c*, 30*b* and 30*a* are placed adjacent open and close buttons 14 and 16 and the accompanying adjust buttons 20 and 22. A corresponding icon is located adjacent the open and close buttons 14*a* and 16*a* as well as adjust buttons 20*e* and 22*e* for the drapes. The remote control of FIG. 3B also provides buttons 14*b* and 16*b* and accompanying adjust buttons to control lights. In all cases the on/off buttons are vertically aligned and symmetrically arranged relative to similarly, vertically aligned adjust buttons.

Figure 3B:
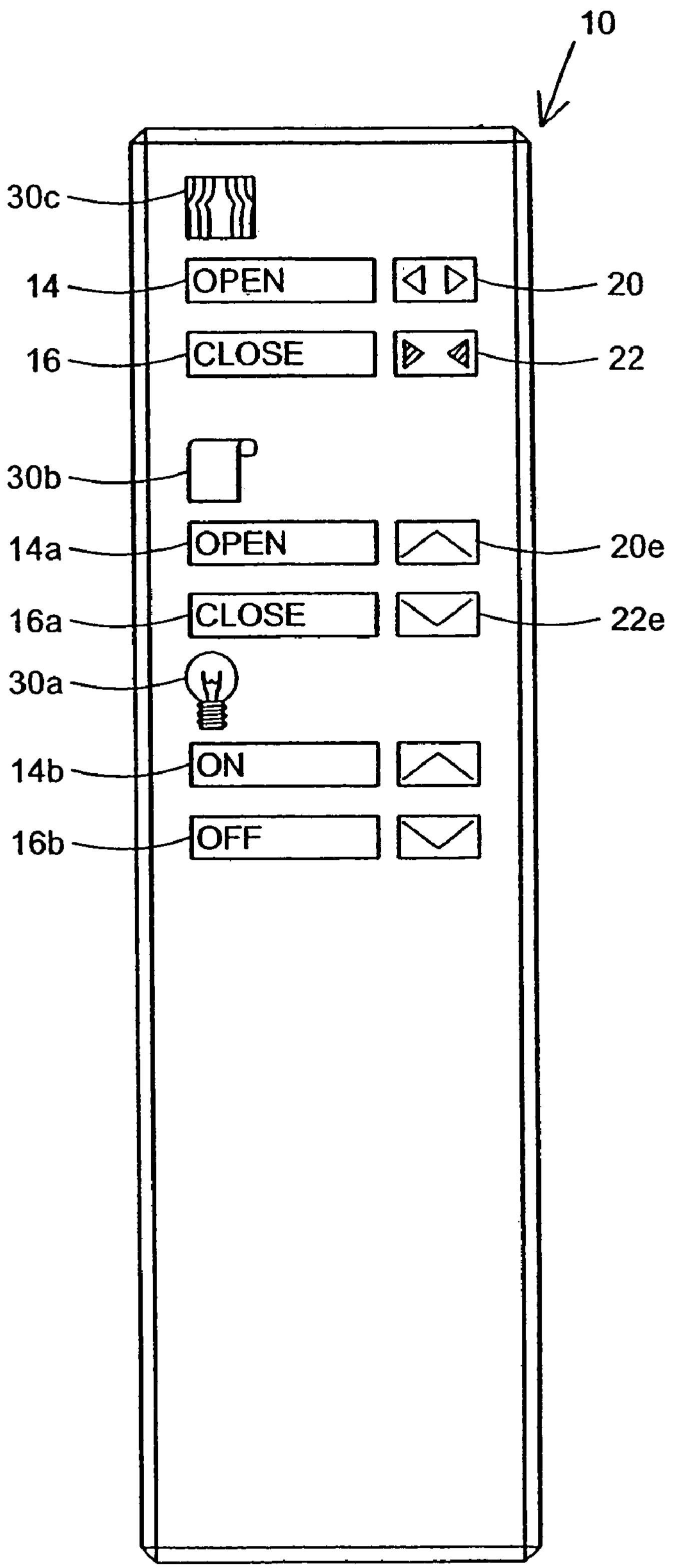
FIG. 3B shows a further embodiment of the hand-held remote control of the present invention which is operable to control a variety of appliances.
Figure 4:
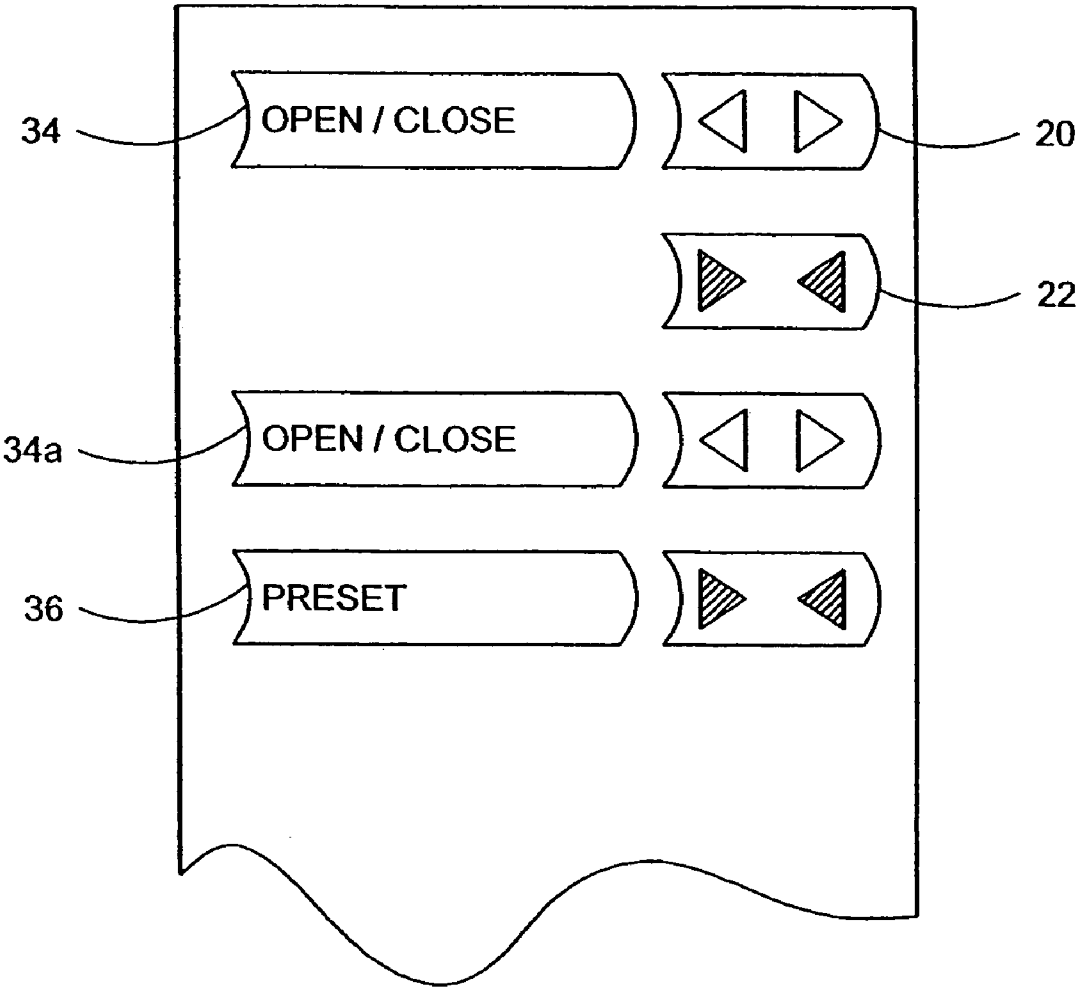
FIG. 4 shows a further embodiment of the present invention.

The button arrangement for the hand-held control shown in FIG. 4 retains the vertical and horizontal alignment of the adjust buttons 20, 22 but replaces the dual buttons 14, 16 of the embodiment of FIG. 3B with a single button 34 which is designed (together with the electronics within the remote control 10) to provide alternate action on and off or open and close commands for the light, shade, etc. In addition, the control of FIG. 4 provides for at least one of the appliances being controlled via a "preset" button 36 which, when actuated, automatically selects a particular adjust position, e.g., a light output level or roller shade position, etc.

Figure 6A:
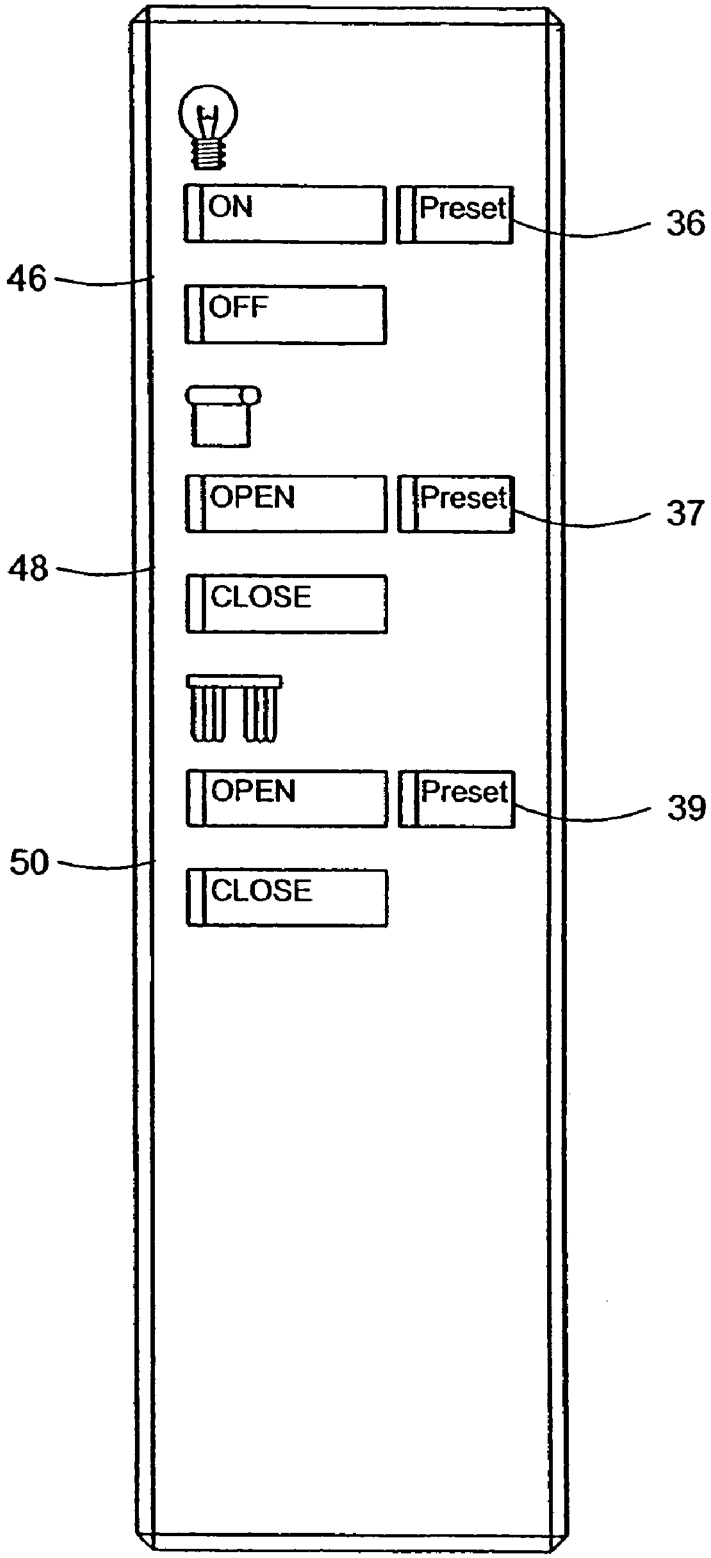
FIGS. 6A and 6B show another embodiment of the present invention that provides fully on and fully off control in conjunction with preset controls for a plurality of appliances.

FIGS. 6A–6D show further ergonomic button arrangements for infrared hand-held remote controls, including, in FIG. 6A, three button groups 46, 48 and 50, to control, respectively, lights, roller shades and drapes, including within each of the groups a respective preset button 36, 37 and 39 which replaces the "adjust" buttons previously described. By depressing any of these preset buttons 36, 37, 39, the light or shade assumes a preset output level or roller shade and drape "preset" position.

The preset buttons 36, 37, 39 can be preset at the factory for particular settings or they may be programmable such as by depressing them sufficiently long, e.g., three seconds or more, whereby the underlying electronics would then start continuously adjusting the particular light level or roller position, etc., and when the preset button is released, the "preset" position is stored. Preset buttons 36, 37, 39 may also have at least one respective default setting, which may be programed by the factory. For example, preset button 36 for light control may have a default setting that causes the lights to illuminate at 25% maximum illumination.

Figure 6B:
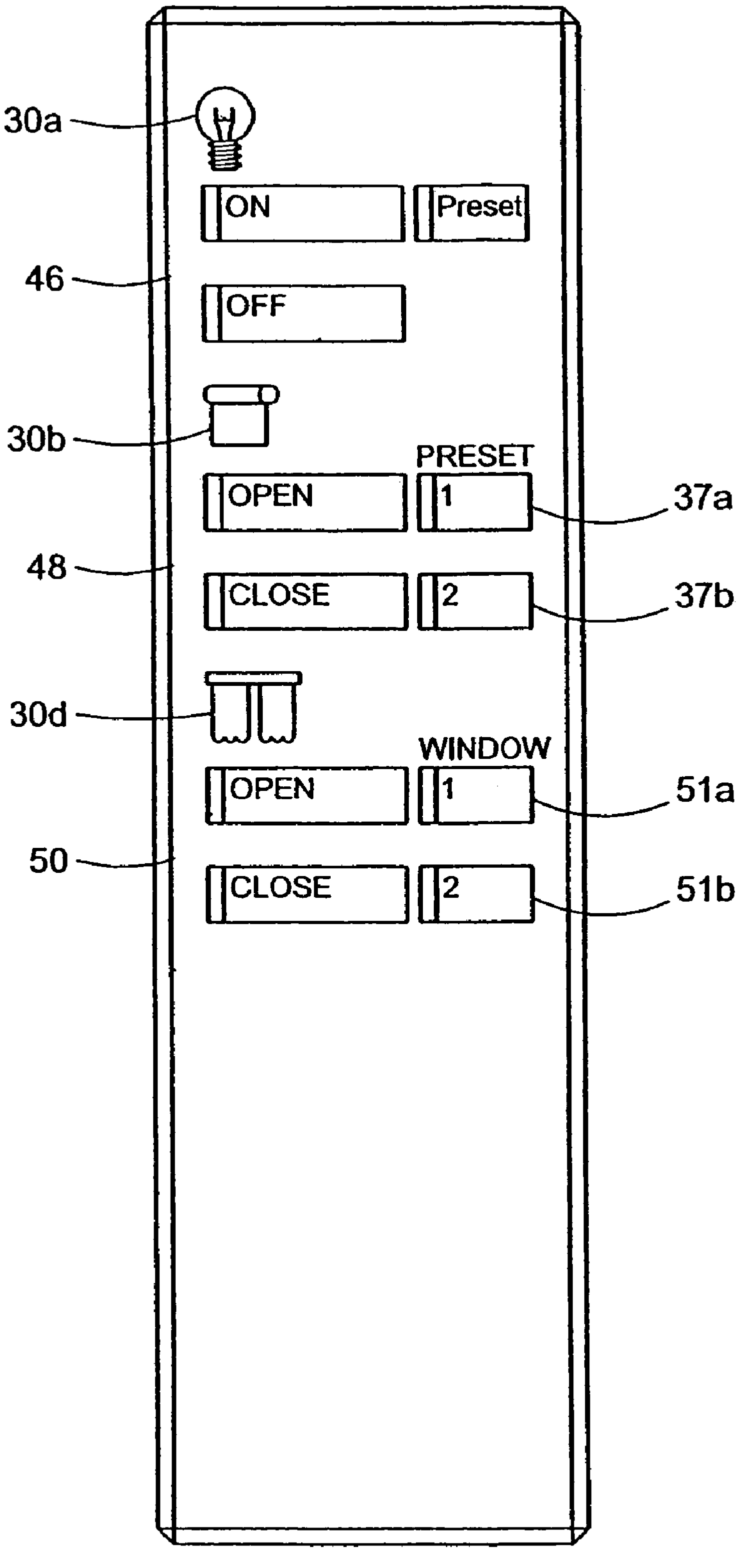

The variation presented in the embodiment of FIG. 6B provides a pair of preset buttons 37*a* and 37*b* for the roller shades of a control of FIG. 6A to enable selection of two separate preset positions and further provides "select" buttons 51*a* and 51*b* for the drape button group 50 of FIG. 6A. These buttons 51*a*, 51*b* allow an operator to select which window drapes are selected to be controlled by the remote control.

Figure 6C:
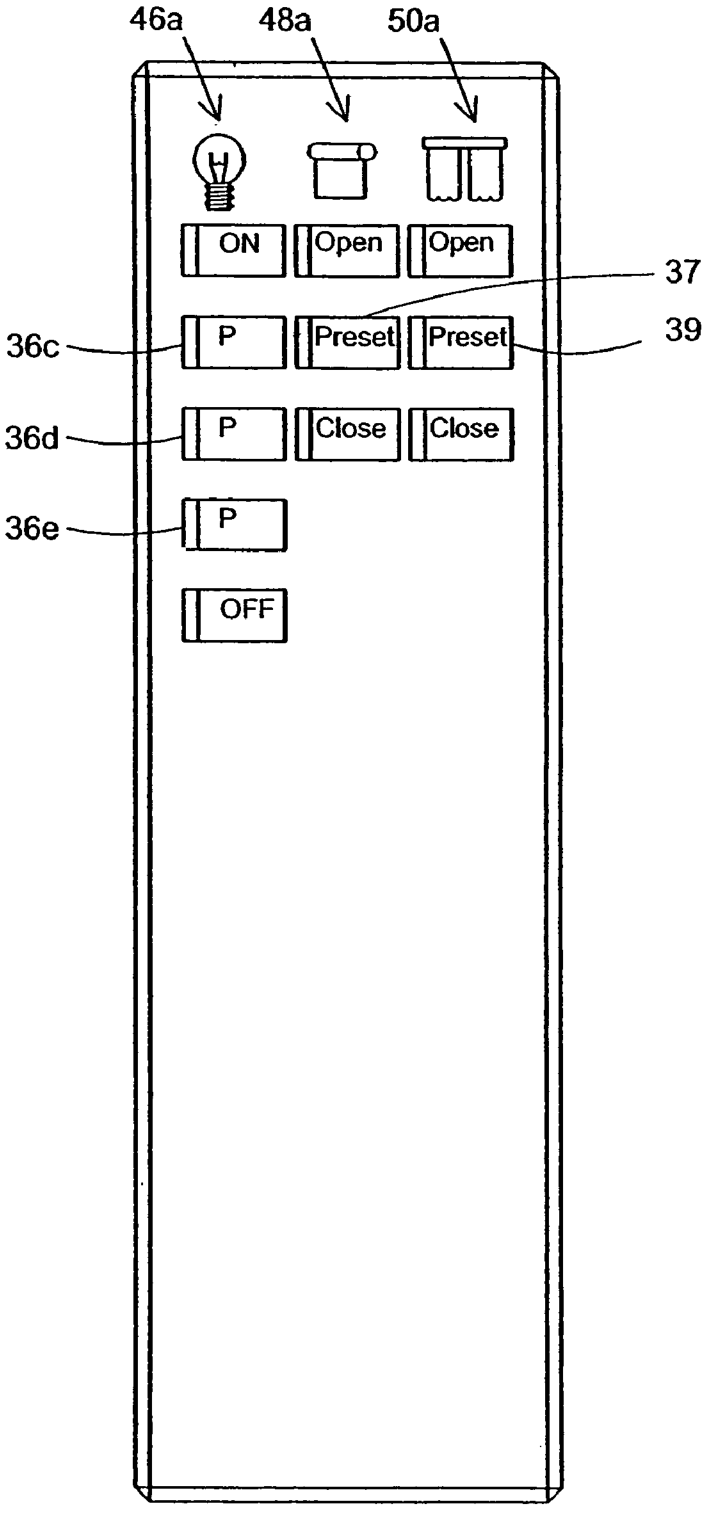
FIG. 6C shows a further embodiment of the invention involving different ergonomically selected button placements.

Yet another button arrangement is shown in FIG. 6C in which both the on/off and open/close buttons are still vertically aligned but are now vertically separated by locating the preset buttons in vertical alignment therewith, as indicated by the preset buttons 39, 37 and 36*c*, 36*d* and 36*e*. The buttons 36*c*, 36*d* and 36*e* provide several preset positions for the lights so that one can readily select between three preset positions without having to adjust or reprogram the preset buttons.

Figure 7:
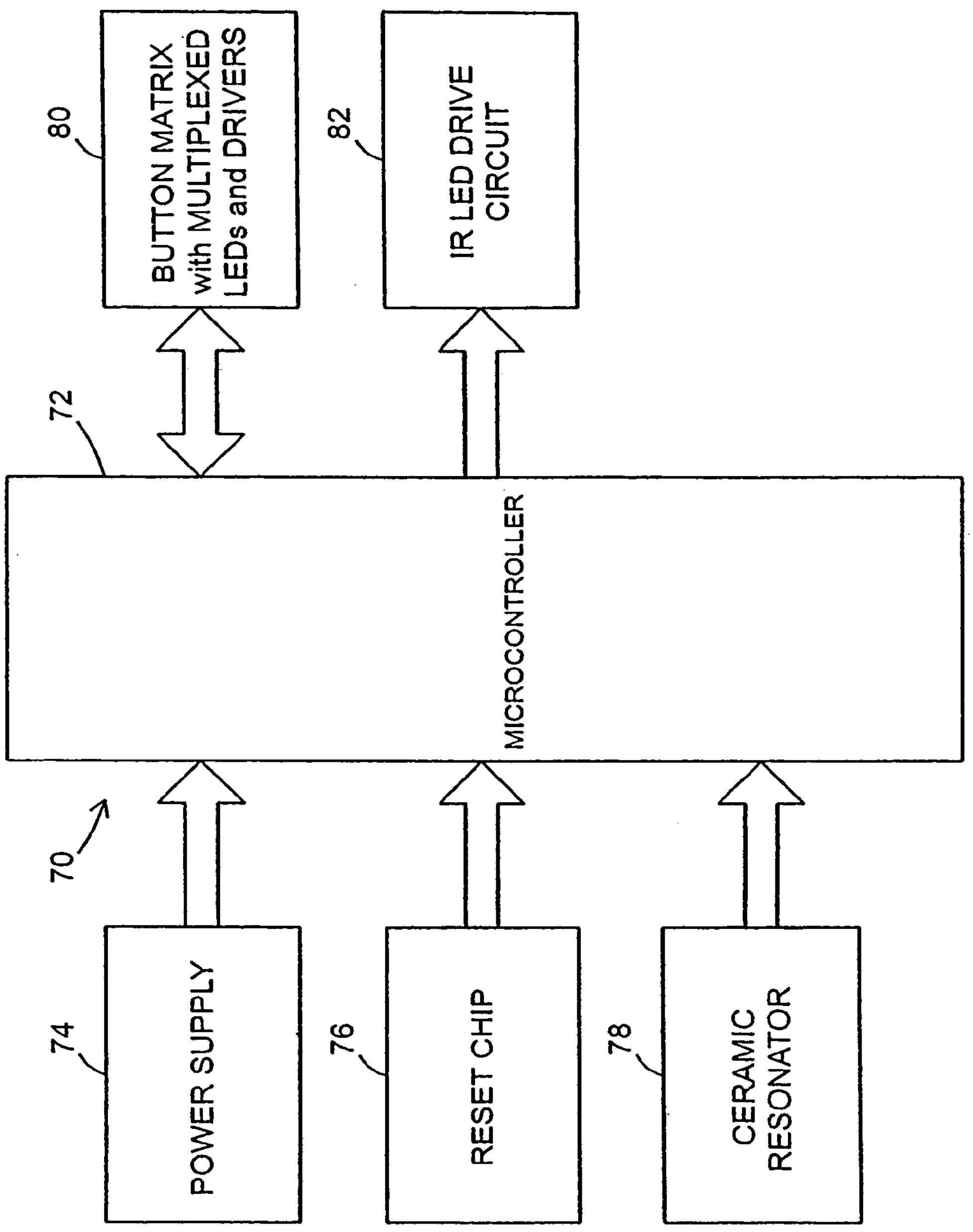
FIGS. 7 and 8 are block diagrams showing major circuit and software sections of the hand-held remote control of the present invention.
Figure 8:
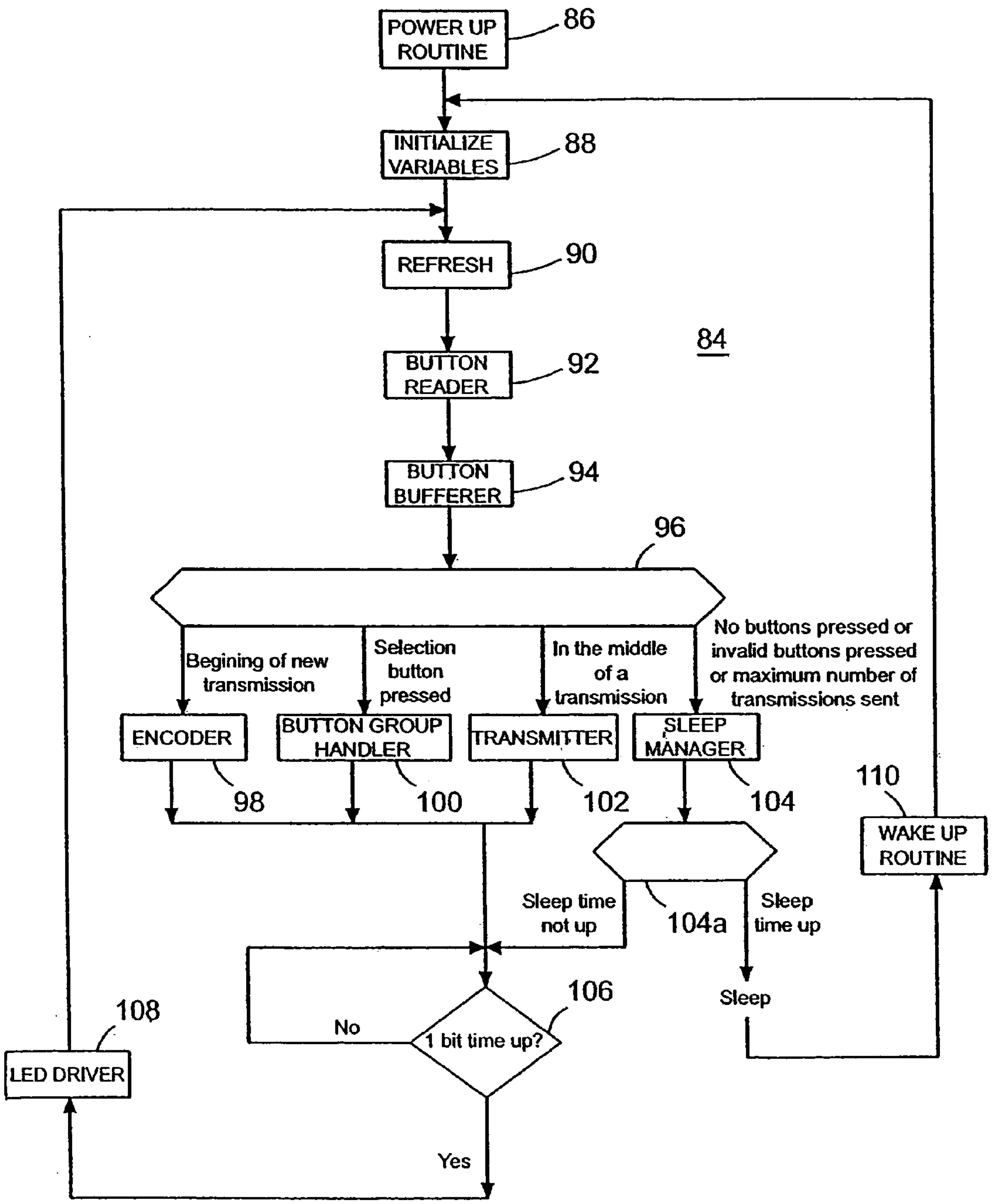
Figure 9B:
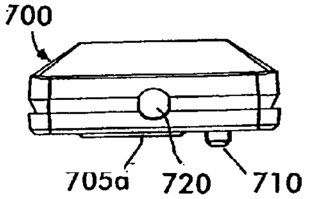
FIG. 9 shows various views of the exemplary remote control of FIG. 7.
Figure 9A:
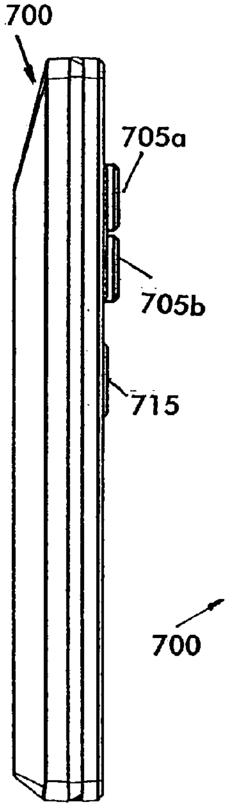
Figure 9F:
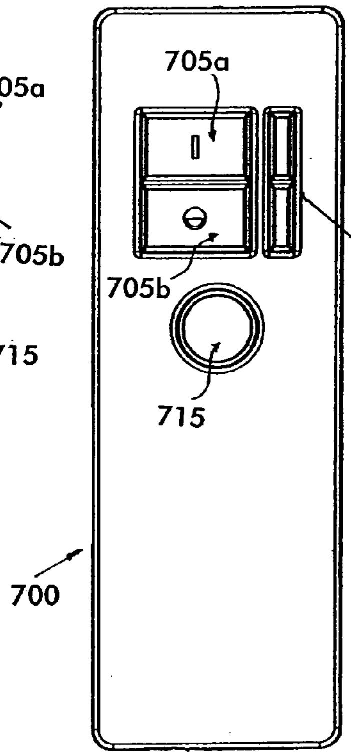
Figure 9C:
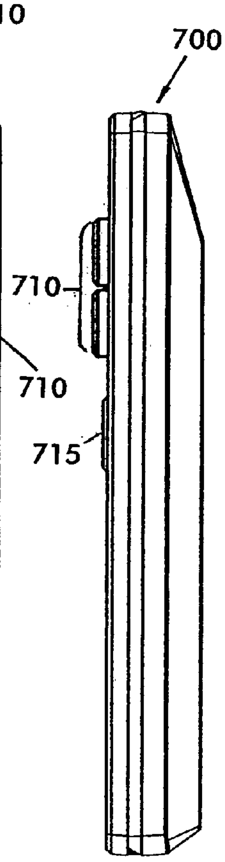
Figure 9D:
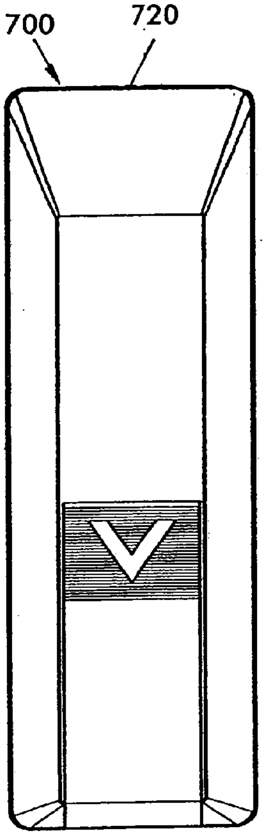
Figure 9E:
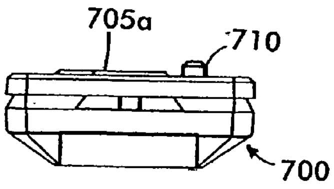

The operation of the various remote control 10 is elucidated by the circuit and software block diagram of FIGS. 7 and 8. In FIG. 7, the system 70 includes a microcontroller 72 and other electronic components that are powered by a power supply 74, e.g., a battery. A reset circuit 76 is coupled to the microcontroller and a ceramic resonator 78 provides the basic clock signal that controls the sequential steps of the computer instructions executed within the microcontroller 72.

For input/output, the button matrix block 80 comprises the circuitry that senses and communicates to the microcontroller 72 which buttons have been depressed and/or which indicators on the face of the control 10 need to be illuminated. The actual drive signals for LED or other display devices are supplied to the LED drive circuit 82.

As shown in FIG. 8, the software 84 implements an algorithm that executes a power-up routine at block 86 when the device is first turned on and proceeds to carry-out the initialization of various variables at step 88. The refreshing of button positions and other functions within the system 70 is carried out by the software at block 90. The button reader 92 constantly queries the various buttons as part of the overall process 84, noting which buttons have been depressed and storing those settings in a table or register 94.

The overall process nerve center at 96 selects one of a plurality of functions such as those provided in the encoder block 98, button group handling block 100, the transmitter block 102 and the sleep manager 104 which handles power conservation. Based on the determination at the decision block 104*a*, when the sleep time has been determined to have run, the wake up routine 110 is invoked and the process then repeats as indicated. If the sleep time has not run up, then the decision block software 106 queries whether the 1 bit time is up and proceeds to refresh the driver, so that the LEDs are properly strobed to obtain the proper display visibility.

Figure 5:
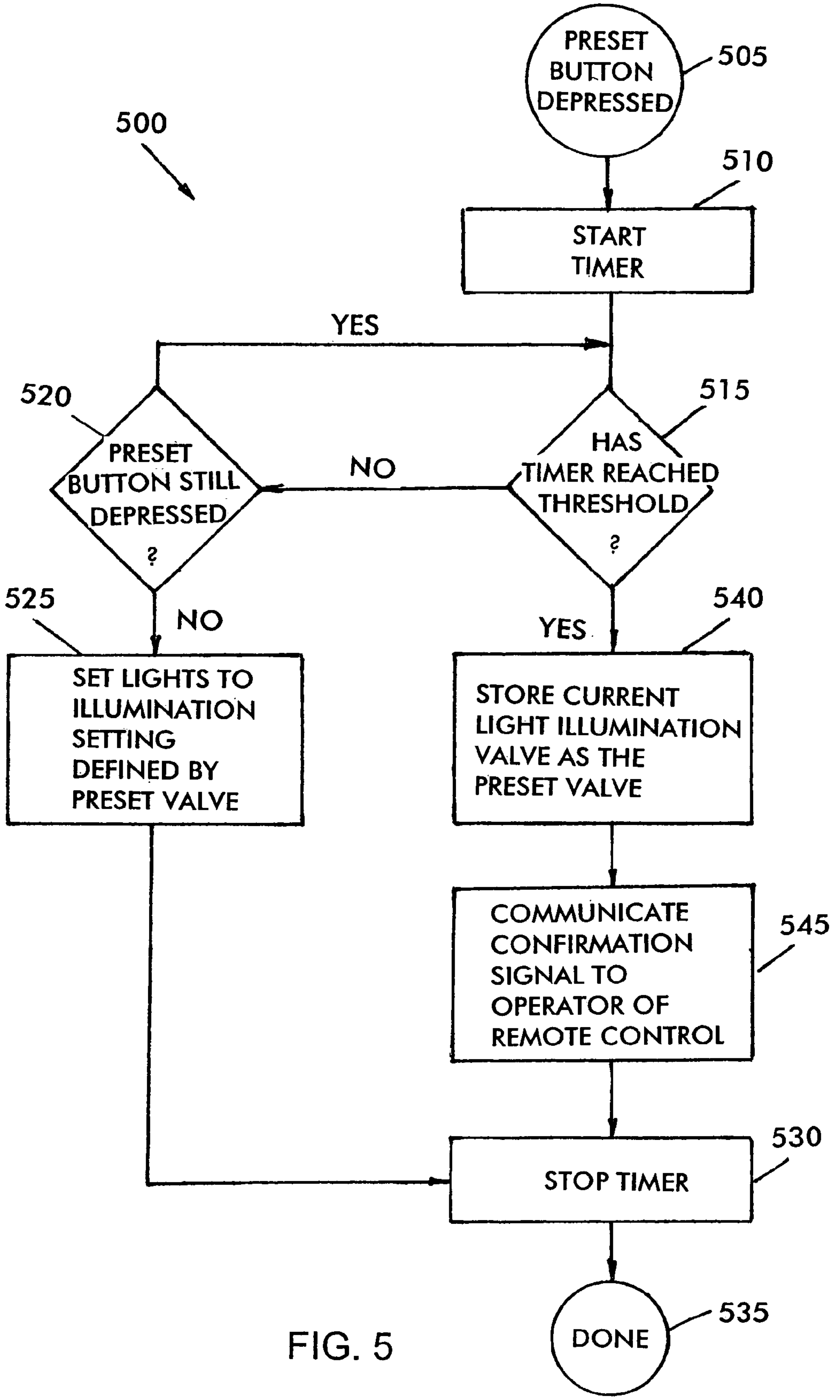
FIG. 5 is a block diagram showing an operational sequence for operating and programming a preset setting according to the present invention.

Referring now to FIG. 5, there is seen an operational sequence 500 for operating and programming a preset setting according to the present invention. Those having ordinary skill in the art will appreciate that the remote control 700 may include more than one preset setting respectively assigned to more than one device to be controlled. However, for the sake of brevity, only operation of preset button 36 for light control will be described.

To begin the sequence, an operator depresses preset button 36, which causes the operational sequence 500 to progress from step 505 to step 510. In step 510, an internal timer within the infrared hand-held remote control is reset and then started. In step 515, it is checked whether the timer has exceeded a predetermined threshold value, for example, two seconds. If not, it is checked whether preset button 36 is still depressed in step 520. If so, the operational sequence reverts back to step 515 to check whether the timer has exceeded the predetermined threshold value. If not, the sequence 500 proceeds to step 525, in which the lights are set to an illumination setting defined by the preset level for light control stored in a memory. Then, the internal timer is stopped in step 530, with the sequence 500 ending at done step 535.

If it is determined that the internal timer has exceeded the predetermined threshold in step 515, the operational sequence 500 proceeds to step 540, in which the current illumination value of the lights is stored in memory as the preset level for light control. The memory may reside in any circuit communicatively coupled to the remote control system. For example, the memory may reside in the remote control itself and/or in the remote control receiver unit. Then, the sequence 500 proceeds to step 545, in which a confirmation signal is communicated to the operator to inform him/her that a new preset for light control has been stored. The internal timer is then stopped in step 530, and sequence 500 ends at done step 535.

The confirmation signal communicated to the operator may comprise any observable characteristic capable of informing the operator that a new preset for light control has been stored, and the confirmation signal may be generated by the infrared remote control or by any other device communicatively coupled to the infrared remote control. For example, the confirmation signal may comprise an audible "beep" produced by the infrared hand-held remote control or by the infrared remote control receiver. Or, for example, the confirmation signal may comprise a flash of light produced by a light emitting element (e.g., a light bulb, and LED, an LED backlight illuminating the preset button itself, etc.) on the infrared hand-held remote control and/or on the infrared remote control receiver.

In a preferable embodiment, the confirmation signal is communicated by the device to which the preset value is assigned. For example, with respect to preset button 36 for light control, the confirmation signal may be communicated to the operator by the lights themselves. For example, to confirm that a new preset value for light control has been stored, the infrared remote control may cause the lights to flash in succession, for example, to flash in rapid succession. Or, for example, to confirm that a new preset 37 for shade control has been stored, the infrared remote control may cause the shades to rise and fall quickly before settling to the preset height. Or, for example, to confirm that a new preset 39 for drape control has been stored, the infrared remote control may cause the drapes to open and close quickly before settling to the desired preset.

Figure 1A:
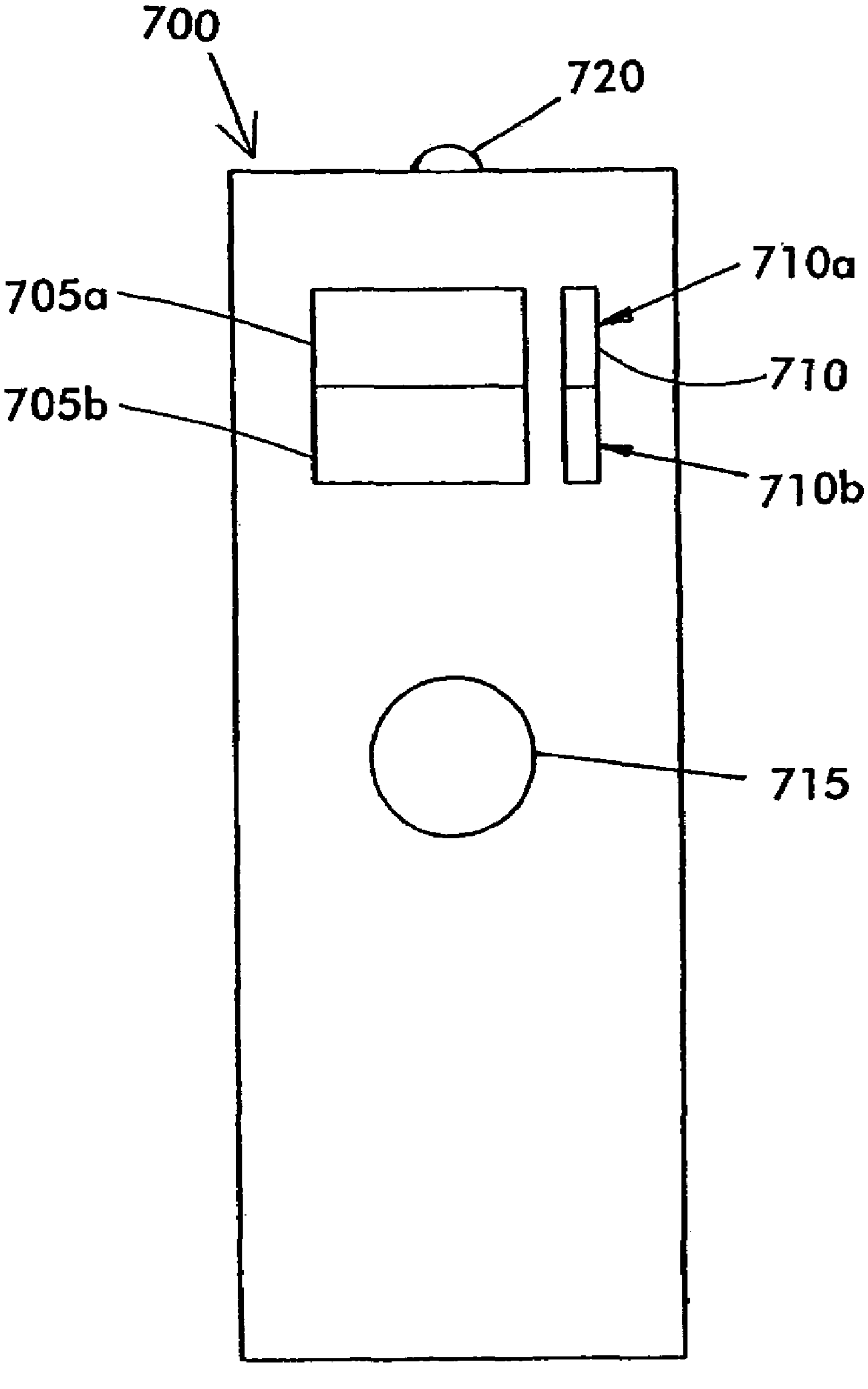
FIG. 1*a* shows an exemplary remote control having a preset button according to the present invention.

Referring now to FIG. 1*a*, there is seen an exemplary infrared remote control 700 operable to control lights and to set and/or recall at least one preset setting assigned to the lights, according to the present invention. Remote control 700 includes an infrared emitter 720 and two large buttons 705*a*, 705*b* disposed in vertical arrangement on the left side of the control. Buttons 705*a*, 705*b* comprise on and off controls for a light. Immediately to the right of buttons 705*a*, 705*b*, is a set of vertically disposed buttons 710*a*, 710*b*, which may be pressed to cause the light to brighten or dim in a continuous fashion between the two extremes that are controlled by the on and off (or the open and close buttons) buttons 705*a*, 705*b*. Remote control 700 is also provided with a preset button 715 for setting and/or recalling a preset value for light control from memory, as more fully described above with respect to the operational sequence 500 of FIG. 5. Preferably, preset button 715 is colored in stark contrast to the colors used for the remaining buttons and the remote control housing. For example, preset button 715 may be colored bright orange. FIGS. 9*a*–9*f* show various views of remote control 700 of FIG. 1*a*.

It should be appreciated that, although FIG. 1 a illustrates an exemplary remote control having a single preset control for lights, remote control 700 may control more than one device, and may have a separate preset control assigned to each device to be controlled. For example, remote control 700 may have inputs to control lights, shades, and drapes, with a separate preset controls being respectively assigned to each.

Figure 10:
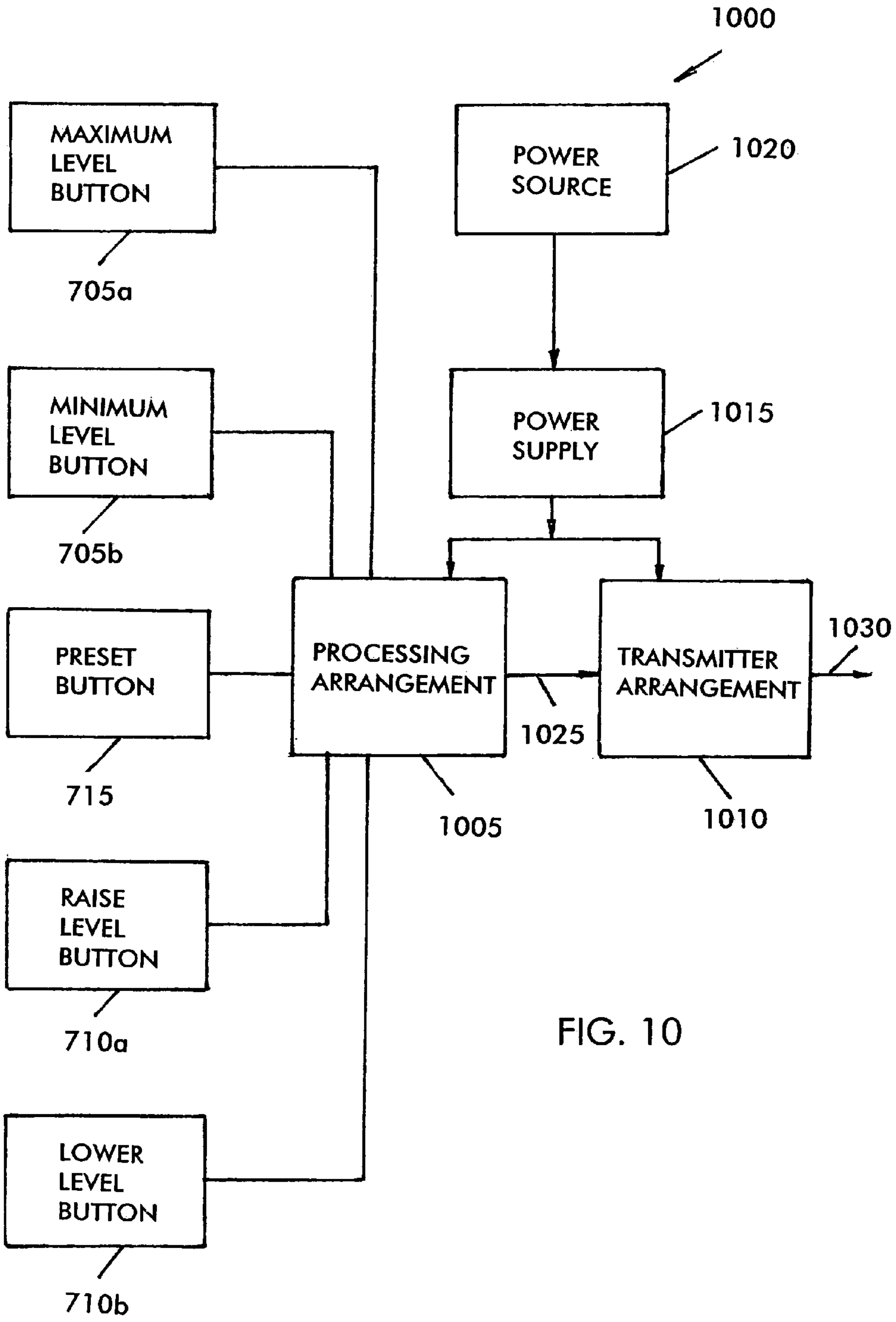
FIG. 10 shows a functional block diagram of the remote control of FIG. 7.

Referring now to FIG. 10, there is seen a functional block diagram 1000 of remote control 700 of FIGS. 7 and 9. Remote control 700 includes a processing arrangement 1005 communicatively and electrically coupled to buttons 705*a*, 705*b*, 710*a*, 710*b*, 715, a transmitter arrangement 1010 communicatively and electrically coupled to processing arrangement 1005, a power supply 1015 to distribute electrical power to processing arrangement 1005 and transmitter arrangement 1010, and a power source 1020 to provide the electrical power distributed by power supply 1015.

Processing arrangement 1005 may include any circuitry operable to process signals communicated by buttons 705*a*, 705*b*, 710*a*, 710*b*, 715 to perform a desired remote control operation. For example, processing arrangement 1005 may include a microprocessor, a microcontroller, an Application Specific Integrated Circuit (ASIC), discrete logic components, and/or any combination of these electrical components. In operation, processing arrangement 1005 formats the signals communicated by buttons 705*a*, 705*b*, 710*a*, 710*b*, 715 into a pre-transmit signal 1025 for communication to transmitting arrangement 1010.

Transmitter arrangement 1010 may include any circuitry operable to convert pre-transmit signal 1025 into a transmit signal 1030 suitable for communication to a remote control receiving unit. For example, if remote control 700 is an infrared remote control, transmitter arrangement 1010 may include an infrared led 720 and accompanying circuitry configured to communicate transmit signal 1030 to a remote control receiver unit having an infrared receiver. Or, for example, if remote control 700 is an RF remote control, transmitter arrangement 1010 may include an RF antenna (not shown) and accompanying circuitry configured to communicate transmit signal 1030 to a remote control receiver unit having a radio frequency receiver. The transmit signal 1030 is communicated to the remote control receiver unit through a medium (e.g., air, space, etc.), as more fully described below.

Figure 12:
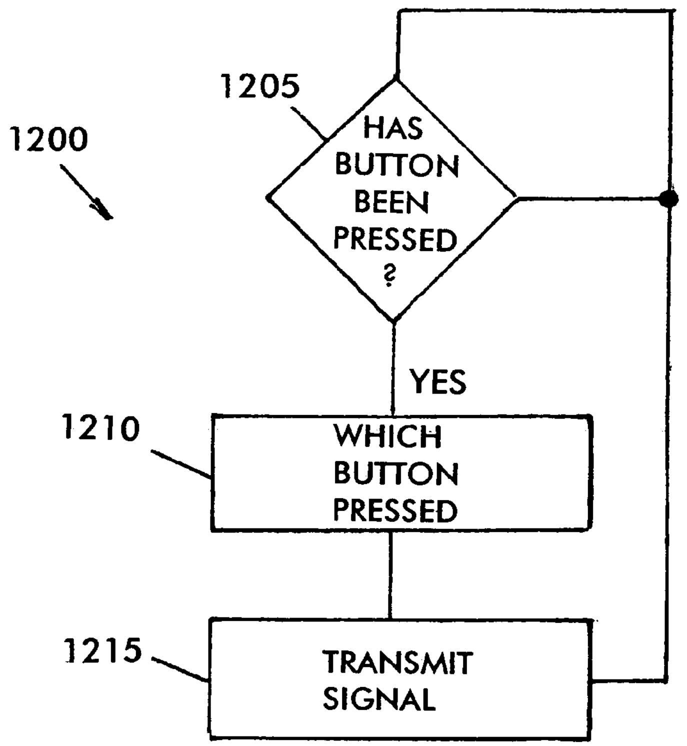
FIG. 12 is a block diagram showing an operational sequence of the remote control of FIG. 7.

Referring now to FIG. 12, there is seen an operational sequence for operation of the hand-held remote control 700 to control a device, for example, lights. In step 1205, processing arrangement 1005 checks whether any of buttons 705*a*, 705*b*, 710*a*, 710*b*, 715 has been pressed. If not, remote control 700 remains in step 1205 until a button press is detected. Once detected, operational sequence 1200 proceeds to step 1210, in which processing arrangement 1005 determines which of buttons 705*a*, 705*b*, 710*a*, 710*b*, 715 has been pressed. Then, in step 1215 processing arrangement formats and generates a unique pre-transmit signal 1025 assigned to the button detected as pressed in step 1210. Transmitter arrangement 1010 then converts the pre-transmit signal 1025 into transmit signal 1030 for transmission to a remote control receiver and reverts back to step 1205 to await the next button press.

Figure 11:
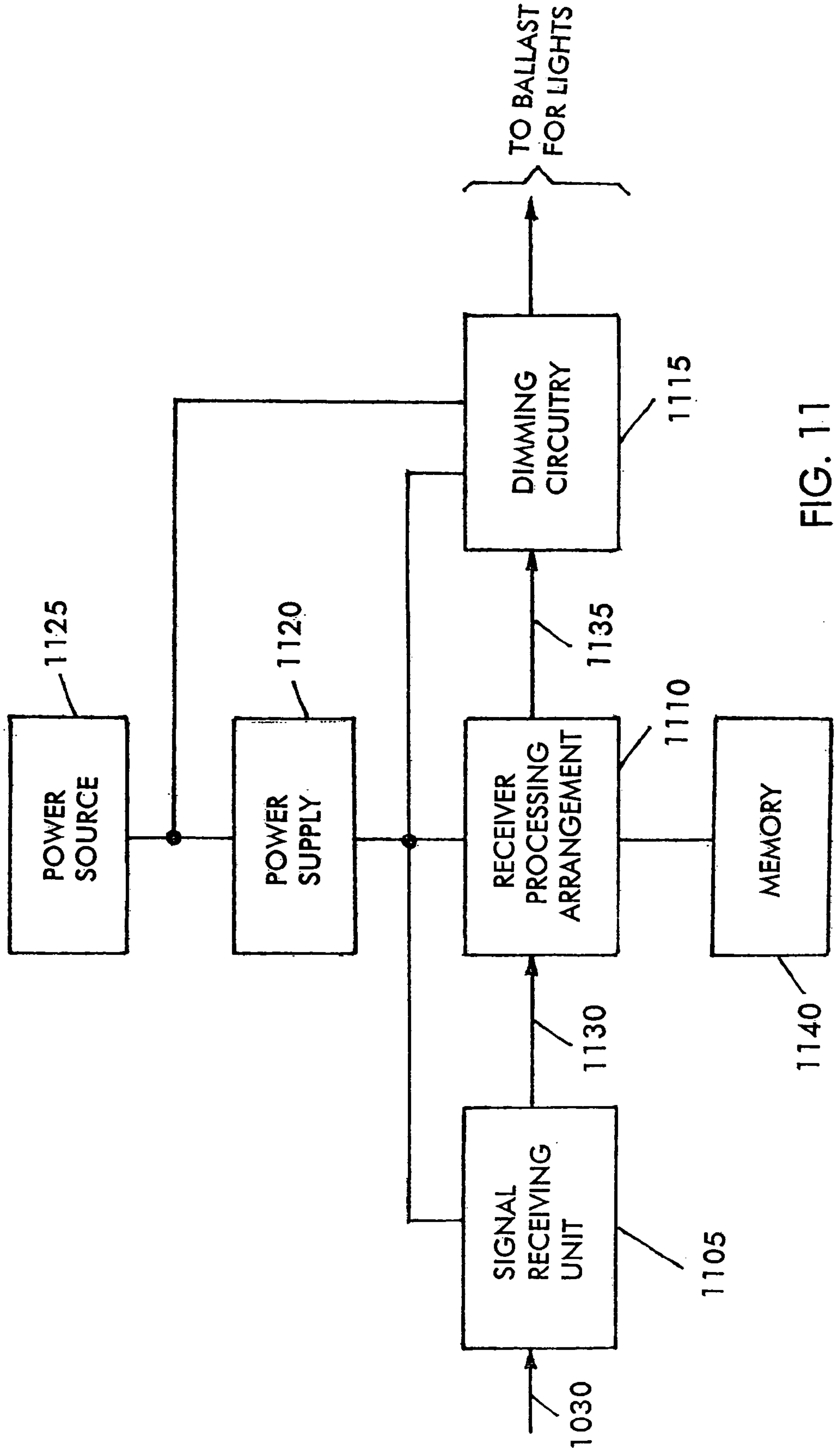
FIG. 11 shows a block diagram of an exemplary receiver arrangement according to the present invention.

Referring now to FIG. 11, there is seen a functional block diagram of an exemplary remote control receiver 1105 according to the present invention. Remote control receiver 1105 includes a signal receiving unit 1105, a receiver processing arrangement 1110 communicatively and electrically coupled to signal receiver unit 1105, a memory unit 1140 communicatively and electrically coupled to processing arrangement 1110, dimming circuitry 1115 communicatively and electrically coupled to processing arrangement 1110, a power supply 1120 to provide electrical power to signal receiving unit 1105, receiver processing arrangement 1110, and dimming circuitry 1115, and a power source 1125 (e.g., a line voltage supplied by a structure in which the receiver 1105 is arranged) to provide the electrical power provided by power supply 1120. Power source 1125 may also be directly connected to dimming circuitry 1115, as shown in FIG. 11.

It should be appreciated that, although FIG. 11 shows a functional block diagram for a remote control receiver 1105 configured to control lights via dimming circuitry 1115, remote control receiver 1105 may include circuitry configured to control other devices. For example, remote control receiver 1105 may include circuitry to control shades, drapes, windows, doors, etc.

Signal receiving unit 1105 includes any circuitry operable to receive transmit signal 1030 from remote control 700 and convert it into receive signal 1130 for communication to receiver processing arrangement 1110. If remote control receiver 1105 is operable to receive an infrared signal from remote control 700, for example, signal receiving unit 1105 may include an infrared receiving diode and accompanying circuitry. Or, for example, if remote control receiver 1105 is operable to receive an RF signal from remote control 700, signal receiving unit 1105 may include an RF receiving antenna (not shown) and accompanying circuitry.

Receiver processing arrangement 1110 may include any circuitry operable to process receive signal 1130 communicated by signal receiving unit 1105. For example, processing arrangement 1110 may include a microprocessor, a microcontroller, an Application Specific Integrated Circuit (ASIC), discrete logic components, and/or any combination of these electrical components. In operation, receiver processing arrangement 1110 communicates a dimming signal 1135 to dimming circuitry 1115 in accordance with the illumination information contained in the transmit signal 1030.

Dimming circuitry 1115 includes all circuitry operable to cause the lights to illuminate at a level defined by dimming signal 1135 communicated by the receiver processing arrangement 1110. For this purpose, dimming circuitry 1115 may include phase control dimming circuitry and/or ballast control circuitry if the lights to be dimmed are controlled by an external ballast.

Figure 13:
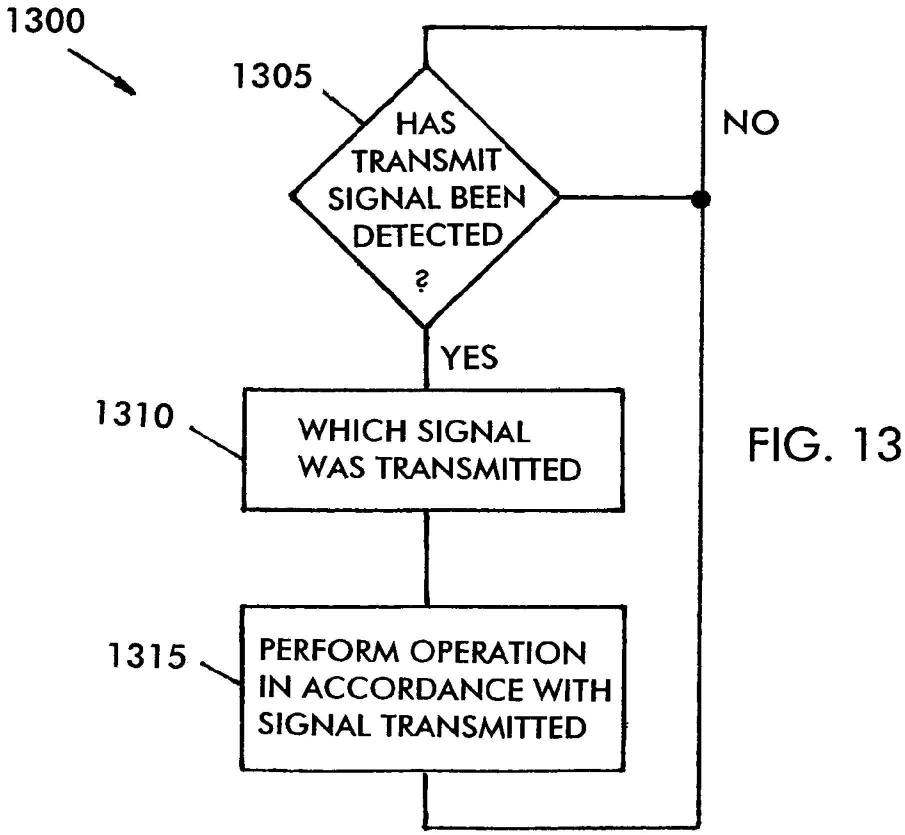
FIG. 13 is a block diagram showing an operational sequence of the receiver arrangement of FIG. 11.

Referring now to FIG. 13, there is seen an operational sequence for operation of remote control receiver 1105. In step 1305, signal receiving unit checks whether a transmit signal 1030 has been received from remote control 700. If not, remote control receiver 1105 remains in step 1305 until a transmit signal 1030 is detected. Once detected, operational sequence 1300 proceeds to step 1310, in which receiver processing arrangement 1110 processes the received signal 1130 to determine which transmit signal 1030 was transmitted by the remote control 700. Then, in step 1215 receiver processing arrangement 1110 properly illuminates the lights in accordance with the transmit signal 1030 by communicating an appropriate dimming signal to dimming circuitry 1115. For example, if receive signal 1130 indicates that the maximum level button 705*a* was pressed, receiver processing arrangement 1110 causes the lights to illuminate at maximum illumination. Or, for example, if receive signal 1130 indicates that the minimum level button 705*b* was pressed, receiver processing arrangement 1110 will cause the lights to illuminate at minimum illumination. Or, for example, if receive signal 1130 indicates that the preset button 715 was pressed, receiver processing arrangement 1110 will perform the operational sequence described above with respect to FIG. 5.

In any event, remote control receiver 1105 may store the current level of illumination in memory 1140 in case of a power cycle or outage. In this manner, remote control receiver 1105 may recall the last illumination setting once power is restored.

The foregoing description of various devices and properties or parameters to be controlled by the remote control of the present invention is extendable to a virtually limitless list of other devices and parameters. Thus, the remote control of the present invention is intended to be applicable to such devices as audio/video equipment, projection screens, motorized sky lights, various doors, e.g., garage doors, heating and cooling appliances, cooking appliances, and the like. The parameters or variables of these appliances include such variables as temperature, heat capacity, light, sound, humidity, ventilation, and other electrical and mechanical properties such as, for example, torque, pressure, force, power, energy, speed, etc.

In accordance with the further concept illustrated in FIG. 3, the various control buttons need not be square or rectangularly shaped. They can be shaped to allow immediate association with the device being controlled. Thus, the buttons for controlling a light may be shaped to convey the image of a light fixture, a button for a roller shade can be in the shape of a roller shade symbol and so on. These shapes include the shapes 31*a* and 31*b* for "light-off" and "light-on", respectively; 31*c* and 31*d* for "shade down" and "shade up", respectively; 31*e* and 31*f* for "roman shade down" and "roman shade up", respectively; and 31*g* and 31*h* for "drapery close" and "drapery open", respectively. Alternatively, the shapes 31*a*–31*h* can be used as decals on differently shaped buttons.

Thus, as described above, in accordance with the various embodiments of the present invention, the invention is directed to a hand-held remote control that includes at least the following features and functionalities. The device is a hand-held remote control for controlling at least two device types chosen from a group that includes lights, roller shades, draperies, and any of the devices listed above or even others. The device includes a plurality of buttons in ordered arrangement, with all buttons relating to a single device type grouped together, within each device type group organized as a first pair of proximate buttons operable to cause the associated device type to go to one of two extreme states, and a second pair of proximate buttons operable to cause the associated device type to go to a state intermediate said two extreme states.

The control device can be a multiple device type hand-held remote control with all buttons associated with a single device type grouped together with each group including a pair of course adjust buttons and a pair of fine adjust buttons. This generic multiple device type can be configured with each pair of proximate buttons being differently sized from the other of said pair of proximate buttons within each device type button group. The relative size of each pair of buttons can be related to the magnitude of the change the particular pair of buttons is capable of controlling. Or the shape of the buttons in the device type group can be the same and be related to the device type. Or, the shape for each device type group can be different from the shapes of all of the other device type groups. The shape of each button within each device type group can be different and related to the function performed by that button. Functionally corresponding buttons in different device type groups can have the same shape. And, the shape of a button can be a visual representation of the end result achieved by actuating the button.

The various features noted above can be selected for any particular implementation of the remote control of the present invention by choosing the features to evolve a particular remote control having a specific selection of features and functionalities and appearance. Those functionalities and features further include each pair of proximate buttons being spaced vertically from each other and each pair of proximate buttons being spaced horizontally from each other and/or each pair of proximate buttons being axially spaced from each other, and the pair of buttons within each device type group being axially spaced from the other pair of proximate buttons orthogonally to the first pair. Buttons can also be differentiated based on their functionality being different as indicated by button color, texture, material, tactile feel and the like. The remote control can have each button provide a single function different from all other functions within each device group. Similarly, buttons can have decals formed directly thereon or adjacent thereto which are different from all of the decals associated with other buttons within each group.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A control system to set a variable physical property of a structure to an operational setting between a maximum setting and a minimum setting, the system comprising:

a control device including first, second, third, and fourth buttons and at least one preset button; and a receiving arrangement communicatively coupled to the control device and to the structure, the receiving arrangement including a memory to store at least one preset setting of the variable physical property, each of the buttons of the control device being exclusively operable to cause a transmission of a respectively assigned signal from the control device to the receiving arrangement when pressed, the receiving arrangement being operable to:

a) set the operational setting of the variable physical property to the maximum setting exclusively when the control device transmits a first signal assigned to the first button, b) set the operational setting of the variable physical property to the minimum setting exclusively when the control device transmits a second signal assigned to the second button, c) increase the operational setting of the variable physical property toward the maximum setting exclusively when the control device transmits a third signal assigned to the third button, d) decrease the operational setting of the variable physical property toward the minimum setting exclusively when the control device transmits a fourth signal assigned to the fourth button, e) set the operational setting of the variable physical property to the preset setting stored in the memory exclusively if the preset button is depressed for a first time duration, and f) store the operational setting of the variable physical property in the memory exclusively if the preset button is depressed for a second time duration.

2. The control system of claim 1, wherein the second time duration is greater than the first time duration.

3. The control system of claim 2, wherein the receiving arrangement is further operable to communicate an observable signal to an operator of the control device to confirm that the operational setting of the variable physical property is stored in the memory when the preset button is depressed for the second time duration.

4. The control system of claim 3, wherein the observable signal includes an audible beep.

5. The control system of claim 3, wherein the receiving arrangement further includes a light emitting arrangement, the observable signal including a flash of light emitted by the light emitting arrangement.

6. The control system of claim 3, wherein the observable signal is communicated by the structure itself.

7. The control system of claim 6, wherein the structure includes a light, the observable signal including at least one flash emitted by the light.

8. The control system of claim 6, wherein the structure includes a drape, the observable signal including at least one movement of the drape.

9. The control system of claim 6, wherein the structure includes a shade, the observable signal including at least one movement of the shade.

10. The control system of claim 1, wherein the control device is a portable hand-held unit with an infrared coupling system to couple the control device to the receiving arrangement.

11. The control system of claim 1, wherein the preset button is colored in stark contrast in comparison to colors of the first, second, third, and fourth buttons.

12. The control system of claim 11, wherein the preset button is colored orange.

13. A receiver unit of a control system to set a variable physical property of a structure to an operational setting between a maximum setting and a minimum setting, the system including a control device having first, second, third, and fourth buttons and at least one preset button, each of the buttons being exclusively operable to cause a transmission of a respectively assigned signal from the control device to the receiver unit when pressed, the receiver unit comprising:

a memory to store at least one preset setting of the variable physical property; and a receiving arrangement communicatively coupled to the memory, the control device and to the structure, the receiving unit being operable to:

a) set the operational setting of the variable physical property to the maximum setting exclusively when the control device transmits a first signal assigned to the first button, b) set the operational setting of the variable physical property to the minimum setting exclusively when the control device transmits a second signal assigned to the second button, c) increase the operational setting of the variable physical property toward the maximum setting exclusively when the control device transmits a third signal assigned to the third button, d) decrease the operational setting of the variable physical property toward the minimum setting exclusively when the control device transmits a fourth signal assigned to the fourth button, e) to set the operational setting of the variable physical property to the preset setting stored in the memory exclusively if the preset button is depressed for a first time duration, and f) to store the operational setting of the variable physical property in the memory exclusively if the preset button is depressed for a second time duration.

14. The receiver unit of claim 13, wherein the second time duration is greater than the first time duration.

15. The receiver unit of claim 14, wherein the receiving arrangement is further operable to communicate an observable signal to an operator of the control device to confirm that the operational setting of the variable physical property is stored in the memory when the preset button is depressed for the second time duration.

16. The receiver unit of claim 15, wherein the observable signal includes an audible beep.

17. The receiver unit of claim 15, wherein the receiving arrangement further includes a light emitting arrangement, the observable signal including a flash of light emitted by the light emitting arrangement.

18. The receiver unit of claim 15, wherein the observable signal is communicated by the structure itself.

19. The receiver unit of claim 18, wherein the structure includes a light, the observable signal including at least one flash emitted by the light.

20. The receiver unit of claim 18, wherein the structure includes a drape, the observable signal including at least one movement of the drape.

21. The receiver unit of claim 18, wherein the structure includes a shade, the observable signal including at least one movement of the shade.

22. The receiver unit of claim 13, wherein the receiving arrangement is operable to store the operational setting of the variable physical property in the memory so that the operational setting may be retrieved from the memory after a power supply thereof is turned on.

23. A control system to set a variable physical property of a structure to an operational setting between a maximum setting and a minimum setting, the system comprising:

a control device including first, second, third, and fourth buttons and at least one preset button; and a receiving arrangement communicatively coupled to the control device and to the structure, the receiving arrangement including a memory to store at least one preset setting of the variable physical property, each of the buttons of the control device being exclusively operable to cause a transmission of a respectively assigned signal from the control device to the receiving arrangement when pressed, the receiving arrangement being operable to:

a) to set the operational setting of the variable physical property to the preset setting stored in the memory exclusively if the preset button is depressed for a first time duration, and b) to store the operational setting of the variable physical property in the memory exclusively if the preset button is depressed for a second time duration, the receiving arrangement communicating an observable signal to an operator of the control device to confirm that the operational setting of the variable physical property is stored in the memory when the preset button is depressed for the second time duration;

c) to set the operational setting of the variable physical property to the maximum setting exclusively when the control device transmits a first signal assigned to the first button; and d) to set the operational setting of the variable physical property to the minimum setting exclusively when the control device transmits a second signal assigned to the second button.

24. The control system of claim 23, wherein the second time duration is greater than the first time duration.

25. The control system of claim 23, wherein the observable signal includes an audible beep.

26. The control system of claim 23, wherein the receiving arrangement further includes a light emitting arrangement, the observable signal including a flash of light emitted by the light emitting arrangement.

27. The control system of claim 23, wherein the observable signal is communicated by the structure itself.

28. The control system of claim 27, wherein the structure includes a light, the observable signal including at least one flash emitted by the light.

29. The control system of claim 27, wherein the structure includes a drape, the observable signal including at least one movement of the drape.

30. The control system of claim 27, wherein the structure includes a shade, the observable signal including at least one movement of the shade.

31. The control system of claim 23, wherein the control device is a portable hand-held unit with an infrared coupling system to couple the control device to the receiving arrangement.

32. The control system of claim 23, wherein the preset button is colored in stark contrast in comparison to colors of the first, second, third, and fourth buttons.

33. The control system of claim 32, wherein the preset button is colored orange.

* * * * *

UNITED STATES PATENT AND TRADEMARK OFFICE

CERTIFICATE OF CORRECTION

PATENT NO. : 7,142,932 B2
APPLICATION NO. : 10/741278
DATED : November 28, 2006
INVENTOR(S) : Spira et al.

It is certified that error appears in the above-identified patent and that said Letters Patent is hereby corrected as shown below:

(73) Assignee: should read

-- Lutron Electronics Co., Inc.
Coopersburg, PA (US) --

Signed and Sealed this

Twenty-seventh Day of February, 2007

JON W. DUDAS
*Director of the United States Patent and Trademark Office*